United States Patent [19]

Fujii et al.

[11] Patent Number: 4,855,204

[45] Date of Patent: Aug. 8, 1989

[54] WHITE TONER CONTAINING A HIGH PURITY TITANIUM DIOXIDE PIGMENT

[75] Inventors: Masanori Fujii, Sakai; Shuji Komura, Nara; Shunsuke Oogami, Sakai, all of Japan

[73] Assignee: Mita Industrial Co., Ltd., Osaka, Japan

[21] Appl. No.: 159,238

[22] Filed: Feb. 23, 1988

[30] Foreign Application Priority Data

Feb. 26, 1987 [JP] Japan ................... 62-45014
Mar. 31, 1987 [JP] Japan ................... 62-80576

[51] Int. Cl.$^4$ ............................... G03G 9/08
[52] U.S. Cl. ........................ 430/106; 428/407
[58] Field of Search .............. 430/106; 428/407

[56] References Cited

U.S. PATENT DOCUMENTS 4,443,527  4/1984  Heikens et al. ................ 428/407

FOREIGN PATENT DOCUMENTS 59-105652  6/1984  Japan ................... 430/106
59-181361 10/1984  Japan ................... 430/106
2026506A  2/1980  United Kingdom ........ 430/106

*Primary Examiner*—Paul R. Michl
*Assistant Examiner*—Jeffrey A. Lindeman
*Attorney, Agent, or Firm*—Sherman and Shalloway

[57] ABSTRACT

A white toner comprising a fixing resin and dispersed therein, a titanium dioxide pigment of high purity containing at least 99% by weight of $TiO_2$, not more than 0.1% by weight of $Al_2O_3$ and not more than 0.05% by weight of $SiO_2$ as a white pigment. The white toner has markedly improved hygroscopicity as a result of using the white pigment in which the contents of metal oxides such as $Al_2O_3$ and $SiO_2$ are reduced to very small amounts. The toner can thus retain the stable and uniform amount of triboelectric charge, and permits effective circumvention of troubles such as the reduction of image density, background fog and image blurring.

10 Claims, No Drawings

WHITE TONER CONTAINING A HIGH PURITY TITANIUM DIOXIDE PIGMENT

BACKGROUND OF THE INVENTION

1. Field of the Invention

This invention relates to a white toner having stable triboelectric charging characteristics as a developer for use in electrophotography.

2. Description of the Prior Art

Image copying on colored paper using a white toner is known as a simmple method of obtaining a reversal image, i.e. a negative image, in electrophotography.

The white toner is obtained generally be dispersing a white pigment such as titanium dioxide in a fixing resin medium. With known white toners, however, it is difficult to obtain a uniform amount of triboelectric charge, and therefore, they have the disadvantage of causing various troubles such as the reduction of image density, background fog and image blurring. The difficulty of obtaining uniform triboelectric charge with known white toners is believed to be due to the hydroscopic nature of the white toners which leads to agglomeration in a developing device.

SUMMARY OF THE INVENTION

The present inventors made extensive investigations on the hydroscopicity of such a white toner, and have found that certain oxides contained in the titanium dioxide pigment in the white toner are hydroscopic and consequently, the white toner shows hydroscopicity.

It is an object of this invention to provide a white toner having reduced hydroscopicity and being effectively free from agglomeration and the nonuniformity of the amount of triboelectric charge which are due to moisture absorption.

According to this invention, there is provided a white toner comprising a fixing resin medium and dispersed therein, a titanium dioxide pigment of high purity obtaining at least 99% by weight of $TiO_2$, not more than 0.1% by weight of $Al_2O_3$ and not more than 0.05% by weight of $SiO_2$ as a white pigment.

DETAILED DESCRIPTION OF THE INVENTION

White pigment

The marked feature of the white toner of this invention resides in the use of a titanium dioxide pigment of high purity (with a $TiO_2$ content of at least 99% by weight, particularly at least 99.5% by weight) as a white pigment.

The white titanium dioxide pigment of high purity used in the invention contains not more than 0.1% by weight, particularly not more than 0.05% by weight, of $Al_2O_3$, not more than 0.05% by weight, particularly not more than 0.03% by weight, of $SiO_2$, and not more than 0.01% by weight, particularly not more than 0.005% by weight, of $Fe_2O_3$. Thus, the amounts of the oxides contained as impurities are limited to very small amounts.

Heretofore, titanium dioxide pigments used in the production of paints, inks and plastics have been used without modification as pigments for toners. These titanium dioxide pigments are surface-treated with a hydrous oxide of aluminum or silicon in order to adjust its amount of oil absorption and its amount of water absorption and thus increase its dispersibility in a solvent.

Accordingly, the amount of $TiO_2$ contained in such a titanium dioxide pigment is usually 94 to 97% by weight, and about 98% by weight at most. It contains much metal oxides such as alumina and silica. The high content of such impurity oxides is believed to induce adsorption of water molecules and eventually lead to the high hydroscopicity of the titanium dioxide pigment.

In contrast, the white toner of this invention can effectively avoid adsorption of water molecules to the oxides of the titanium dioxide pigment and consequently has markedly reduced hygroscopicity because the titanium dioxide pigment used there contains at least 99% by weight, particularly at least 99.5% by weight, of $TiO_2$ and very small amounts of oxide components such as $Al_2O_3$ and $SiO_2$.

The titanium dioxide pigment of high purity can be produced easily by a chlorine method known per se in which, especially, surface treatment with an aluminum-containing or silicon-containing compound such as alumina or silica is not performed, or even when it is performed, the amount of such a compound is reduced so that the contents of alumina and silica in the final titanium dioxide are within the above-specified ranges.

This chlorine method will be briefly described.

As a raw material, natural rutile and synthetic rutile having a $TiO_2$ content of at least 90% by weight and titanium slag having a $TiO_2$ content of about 85% may be used.

The raw material is fluidized and chlorinated using chlorine and coke to obtain titanium tetrachloride. The reaction temperature is usually 900° to 1100° C. This reaction is shown by the following reaction equation.

$$TiO_2 + 2Cl_2 + C \rightarrow TiCl_4(g) + CO_2$$

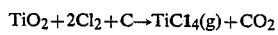

The resulting crude titanium tetrachloride contains chlorides of iron, silicon, vanadium, etc. and may be purified by such a means as fractional distillation.

The purified titanium tetrachloride is gasified, preheated and sent to an oxidizer together with preheated oxygen gas. They are instantaneously reacted to form titanium dioxide particles. This reaction is represented by the following reaction equation.

$$TiCl_4 + O_2 \rightarrow TiO_2 + 2Cl_2$$

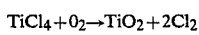

Chlorine generated at this time is recovered and recycled. Titanium dioxide is then pulverized and sized, surface-treated with an aluminum- or silicon-containing compound such as alumina or silica, and further washed, dried and again pulverized to give the final product.

In the chlorine method, a starting ore of a very high $TiO_2$ content is used, and purified titanium tetrachloride is instantaneously reacted to form titanium dioxide. Hence, there is hardly any inclusion of metal oxides such as alumina, calcium oxide or magnesium oxide, and the final product has a high purity and a very high degree of whiteness. The amount of $Fe_2O_3$ includes is limited to a very small one.

The high purity titanium dioxide pigment used in the present invention can be easily produced by omitting the surface-treatment with the aluminum- or silicon-containing compound or by performing this surface-treatment using a small amount of the treating compound. As a result of using this modified chlorine method, the resulting titanium dioxide pigment sometimes has slightly inferior dispersibility in a medium, but this gives rise to no problem so long as it is used as an additive for a toner.

The so-called sulfuric acid method is known for the production of titanium dioxide. Generally, however, this method is difficult of giving a titanium dioxide pigment of high purity and is not suitable for production of the titanium dioxide pigment used in the present invention. In the sulfuric acid method, ilumenite is used as a raw material ore. Ilumenite is a low-grade ore containing about 40 to 60% of $TiO_2$ with much impurities such as metal oxides. For example, it contains $Fe_2O_3$ in an amount on the order of 20%. Such impurities are very difficult to remove by the above method to such small amounts as specified by the present invention.

An example of analysis values of a preferred titanium dioxide pigment to be incorporated in the white toner of this invention is shown in Table 1. Such titanium dioxide pigment is commercially available, for example, under the tradename CR-EL which is high-purity titanium dioxide manufactured by Ishihara Sangyo Kabushiki Kaisha.

The titanium dioxide pigment used in this invention suitably has an average particle diameter of 0.05 to 1.0 microns, preferably 0.2 to 0.4 microns. If its particle diameter is smaller, its specific surface area becomes high and its hydroscopicity undesirably increases.

TABLE 1

| Component | Found value | Method of analysis |
| --- | --- | --- |
| $TiO_2$ | 99.5–99.7 | volumetry |
| $Al_2O_3$ | 0.02–0.05 | absorptiometry |
| $Fe_2O_3$ | 0.0033–0.0044 | " |
| MgO | 0.00 | atomic absorptiometry |
| $Na_2O$ | 0.001–0.003 | " |
| $K_2O$ | 0.00 | " |
| Ni | 0.0003 | " |
| $ZrO_2$ | 0.00 | " |
| $Nb_2O_5$ | 0.00 | fluorescent X-ray method |
| $SiO_2$ | 0.00–0.03 | absorptiometry |
| V | 0.000 | " |
| $Sb_2O_3$ | 0.0001–0.0002 | " |
| CaO | 0.00 | atomic absorptiometry |
| $P_2O_5$ | 0.000 | absorptiometry |
| residue on sieve | 0.003 | substantially following the method of JIS K-5101 |
| $H_2O$ | 0.16 | gravimetry |
| ignition loss | 0.20 | " |

The titanium dioxide pigment is used in an amount of 1 to 50 parts by weight, particularly 2 to 30 parts by weight, per 100 parts by weight of the fixing resin medium to be described. If its amount is larger than the upper limit specified, inconveniences such as the reduction of fixability occur. If it is less than the lower limit specified, it is difficult to exhibit white color fully.

Fixing resin medium

The fixing resin medium used to disperse the titanium dioxide pigment in this invention may be any of those resins which are normally used in the production of toners of this kind. Especialy suitable resin media are homopolymers or copolymers of mono- or diethylenically unsaturated monomers, particularly (a) vinyl aromatic monomers (b) acrylic monomers.

Examples of the monomers (a) are styrene, vinyltoluene, alpha-methylstyrene, alpha-chlorostyrene, vinylxylene and vinylnaphthalene. Examples of the monomers (b) include methacrylic acid, ethyl acrylate, methyl methacrylate, butyl acrylate, butyl methacrylate, 2-ethylhexyl acrylate, 2-ethylhexyl methacrylate, 3-hydroxypropyl acrylate, 2-hydroxyethylmethacrylate, 3-aminopropyl acrylate, 3-N,N-diethylaminopropyl acrylate and acrylamide.

Other monomers used singly or in combination with the monomers (a) or (b) include, for example, butadiene, isoprene, chloroprene, other ethylenically unsaturated carboxylic acids such as maleic anhydride, fumaric acid, crotonic acid and itaconic acid, esters thereof, vinyl esters such as vinyl acetate, vinylpyridine, vinylpyrrolidione, vinyl ethers, acrylonitrile, vinyl chloride and vinylidene chloride. These resins desirably have a molecular weight in the range of 3,000 to 300,000, particularly 5,000 to 200,000.

Additives

White or substantially colorless toner additives which do not adversely affect the color of the resulting toner, for example a charge controlling agent, an offset preventing agent, a pressure fixability imparting agent and a conductivity imparting agent may be incorporated in the toner of this invention in accordance with known recipes.

The charge controlling agent may be, for example, organic compounds containing a basic nitrogen atom for the purpose of controlling a positive charge, such as basic dyes, aminopyrine, pyrimidine compounds, polynuclear polyamine compounds, aminosilanes and fillers treated with these; and carboxyl-containing compounds for the purpose of controlling a negative charge, such as metal chelates of alkylsalicyclic acids. The suitable amount of the charge controlling agent is 1 to 10 parts by weight, per 100 parts by weight of the toner.

In a method of fixing the toner by hot rolls an offset preventing agent such as a silicone oil, a lowmolecular-weight olefinic resin or a wax may be used in an amount of 2 to 15 parts by weight per 100 parts by weight of the toner.

Where the toner is to be fixed by press rolls, a pressure fixability imparting agent such as paraffin wax, various animal and vegetable waxes and fatty acid amides may be used in an amount of 5 to 30 parts by weight per 100 parts by weight of the toner.

As required, a blue-series coloring agent may be used to correct a yellowish color to a white color. Such a coloring agent of the blue series may be pigments or dyes. Examples of blue pigments include prussian blue, cobalt blue, alkali blue lake, victoria blue lake, phthalocyanine blue, non-metallic phthalocyanine blue, a partially chlorinated product of phthalocyanine blue, fast sky blue and indanthrene blue BC. Examples of blue dyes are methylene blue and ultramarine blue. These blue-series coloring agents may be used in an amount of up to 5 parts by weight, especially 0.001 to 2 parts by weight, per 100 parts by weight of the fixing resin. If such a coloring agent is used in an amount larger than the upper limit specified, the white color of the toner is impaired and undesirably becomes bluish. Most preferably, the coloring agent is used in an amount less than one-tenth of the weight of the white pigment within the above quantitative range.

Production of the white toner

In the present invention, a product obtained by dispersing the white pigment in the fixing resin medium is molded into particles having a diameter of 5 to 50 microns to form a toner.

Production of the toner is carried out by means known per se. For example, the white pigment and the charge controlling agent are mixed with the fixing resin medium together with other optional additives. The mixture is uniformly kneaded and formed into toner particles. The toner particles may be formed by cooling the kneaded mixture and crushing the mixture and optionally sieving the particles. Mechanical rapid agitation may be carried out to round irregularly-shaped particles.

Alternatively, the fixing resin medium is dissolved in a solvent such as toluene and xylene, and flakes of the white pigment are dispersed in the solution. The resulting dispersion is spray-died and granulated to give the desired toner in the form of spherical particles.

The toner of the invention may also be obtained by dissolving the white pigment in a solvent capable of dissolving a monomer but incapable of dissolving a polymer of the monomer, and polymerizing the monomer in the dispersion in the presence of a radical initiator. The monomer is suitably selected from these exemplified hereinabove.

The white toner of the invention so obtained has markedly reduced hydroscopicity, and shows sufficient flowability under high-temperature high-humidity environments. It does not undergo agglomeration in a developing device but is uniformly agitated. Hence, stable charging characteristics are obtained with this white toner, and it gives images free from blurring and background fog even in copying operations performed for an extended period of time.

The following examples illustrate the present invention more specifically.

Table 2 below shows titanium dioxide pigments used as white pigments in the following examples. In these pigments, titani8um dioxide pigment A is one used in accordance with this invention, and the others are for comparison.

All parts in these examples are by weight.

A very fine powder has removed from the pulverized product by using a classifier to obtain a white toner having an average particle diameter of 12 microns.

To improve flowability, 0.25 part of hydrophobic silica (R-972, a product of Nippon Aerosil Co., Ltd.) was added to the white toner and they were agitated in a Henschel mixer to treat the surface of the toner with the silica. Finally, the product was subjected to a vibratory sieve to remove agglomerated particles and obtain a final white toner product.

The resulting white toner was conditioned for 24 hours in an environment kept at a temperature of 20° C. and a humidity of 65%, a temperature of 35° C. and a humidity of 85%, and a temperature of 35° C. and a humidity of 99%, respectively, and then the amount of water in the toner was measured by the Karl-Fischer method using a microwater content measuring device (made by Mitsubishi Chemical Co., Ltd.). The results are shown in Table 3.

The white toner and a ferrite carrier (average particle diameter of 50 microns, made by Nippon Teppun K.K.) were mixed by means of a Nauta mixer (made by Hosokawa Micron Co., Ltd.) to prepare a developer containing the toner in a concentration of 5%.

Using the resulting developer, 10000 copies were produced. A period of test was provided every time 2500 copies were produced. The copying was carried out at a temperature of 20° C. and a humidity of 65% (1st to 2500th copies), at a temperature of 35° C. and a humidity of 85% (2501st to 5000th copies), at a temperature of 20° C. and a humidity of 65% (5001st to 7500th copies), and at a temperature of 35° C. and a humidity of 99% (7501st to 1000 copies).

Table 4 shows changes in the amount of charge, and Table 5 shows image characteristics.

COMPARATIVE EXAMPLES 1-2

Example 1 was repeated except that the titanium dioxide pigment C (Comparative Example 1) or the titanium dioxide pigment D (Comparative Example 2) was used as a white pigment instead of the titanium

TABLE 2

| No. | A | B | C | D | E |
|---|---|---|---|---|---|
| Manufacturer | Ihsihara Sangyo K.K. | " | " | " | " |
| Brand name | CR-EL | CR-50 | A-100 | R-615 | R-820 |
| Method of production | Chlorine method | Chlorine method | Sulfuric acid method | Sulfuric acid method | Sulfuric acid method |
| $TiO_2$ (%) | 99.8 | 95 | 98 | 96 | 93 |
| $Al_2O_3$ (%) | 0.002 | more than 1% in total | more than 1% in total | more than 1% in total | more than 1% in total |
| $SiO_2$ (%) | 0.02 | | | | |
| $Fe_2O_3$ (%) | 0.0034 | | | | |
| Surface treatment | none | Al | none | Al | Al, Si, Zn |

EXAMPLE 1

Titanium dioxide pigment, A 20 parts
Styrene-acrylic resin, 100 parts (PA-525, a product of Mitsui Toatsu Chemicals, Inc.)
Low-molecular-weight 2.0 parts polypropylene (Viscol 550P, a product of Sanyo Chemical Co., Ltd.)
White charge controlling 1.5 parts agent, (Bontron E84, a product of Orient Chemical Co., Ltd.)

The above ingredients were uniformly mixed in a Henschel mixer, then melt-kneaded in a twin-screw extruder, allowed to cool, and finally pulverized finely by a cutting mill.

dioxide pigment A. The results are shown in Tables 3, 4 and 5.

TABLE 3

|  | 20° C. 65% | 35° C. 85% | 35° C. 99% |
|---|---|---|---|
| Example 1 | 0.052% | 0.068% | 0.180% |
| Comparative Example 1 | 0.125% | 0.203% | 0.422% |
| Comparative Example 2 | 0.286% | 0.471% | 0.921% |

TABLE 4

| Number of copies produced | Amount of charge (μc/g) | | |
|---|---|---|---|
| | Example 1 | Comparative Example 1 | Comparative Example 2 |
| 1 | −21.2 | −22.5 | −22.1 |
| 2500 | −22.2 | −21.9 | −20.9 |
| 2501 | −20.1 | −19.5 | −15.1 |
| 5000 | −21.7 | −19.1 | −13.9 |
| 5001 | −23.1 | −20.3 | −18.7 |
| 7500 | −21.9 | −21.9 | −18.5 |
| 7501 | −19.5 | −14.1 | −8.5 |
| 10000 | −19.3 | −13.1 | −6.9 |

TABLE 5

| Number of copies produced | Example 1 | | Comparative Example 1 | | Comparative Example 2 | |
|---|---|---|---|---|---|---|
| | F.D. | Blurring | F.D. | Blurring | F.D. | Blurring |
| 1 | 0 | | 0 | | 0 | |
| 2500 | 0.001 | | 0.001 | | 0.001 | |
| 2501 | 0 | | 0.001 | | 0.007 | X |
| 5000 | 0 | | 0.001 | | 0.006 | Δ |
| 5001 | 0.002 | | 0.002 | | 0.002 | |
| 7500 | 0.001 | | 0.002 | | 0.001 | |
| 7501 | 0.003 | | 0.009 | X | 0.017 | X |
| 10000 | 0.002 | | 0.011 | X | 0.023 | X |

Note:
In Table 5, F.D. shows the degree of background fog. The smaller F.D. values show less background fog. The image blurring was evaluated on the scale of three grades where means good, Δ means fair, and X means poor.

The printing (copying) resistance test in Tables 4 and 5 was carried out by using a commercial plain paper copying machine (DC-111, made by Mita Industrial Co., Ltd.), and the first and the last copies in each environment were examined for image characteristics and charge characteristics. The amount of triboelectric charge was measured by the blow-off method, and the background fog was measured by a reflection densitometer (REFLECTOMETER MODEL TC-6D, made by Tokyo Denshoku Co., Ltd.).

COMPARATIVE EXAMPLE 3

Example 1 was repeated except that the titanium dioxide pigment B shown in Table 2 was used as the white pigment instead of the titanium dioxide pigment A.

The amount of the charge on the toner in the initial stage was −20.4 μc/g, and −21.3 μc/g after producing 5000 copies. The change in the amount of charge was slight, and clear images without fog were obtained during this time.

But when more than 5000 copies were produced, the amount of charge increased, and the resulting copied images showed troubles such as blurring and background fog by toner scattering. Clear images were difficult to obtain.

The amount of water in the toner in an environment kept at a temperature of 35° C. and a humidity of 85% was 0.4%.

What we claim is:

1. A white toner comprising a fixing resin medium and dispersed therein a titanium dioxide pigment of high purity containing at least 99% by weight of $TiO_2$, not more than 0.1% by weight of $Al_2O_3$ and not more than 0.05% by weight of $SiO_2$ as a white pigment, said titanium dioxide pigment having an average particle diameter of not less than 0.05 microns.

2. The white toner of claim 1 wherein the amount of $TiO_2$ contained in the titanium dioxide is at least 99.5% by weight.

3. The white toner of claim 1 wherein the titanium dioxide pigment contains not more than 0.05% by weight of $Al_2O_3$ and not more than 0.03% by weight of $SiO_2$.

4. The white toner of claim 1 wherein the titanium dioxide pigment contains not more than 0.01% by weight of $Fe_2O_3$.

5. The white toner of claim 1 wherein the titanium dioxide pigment is not surface-treated with an aluminumor silicon-containing compound.

6. The white toner of claim 5 wherein the titanium dioxide pigment is produced by the chlorine method.

7. The white toner of claim 1 wherein the amount of the titanium dioxide pigment is 1 to 50 parts by weight per 100 parts by weight of the resin medium.

8. The white toner of claim 1 wherein the titanium dioxide pigment has an average particle diameter of 0.05 to 1.0 micron.

9. The white toner of claim 1 wherein the titanium dioxide pigment has an average particle diameter of 0.2 to 0.5 micron.

10. The white toner of claim 1 wherein the amount of titanium dioxide pigment is 2 to 30 parts by weight per 100 parts by weight of the resin medium.

* * * * *